(12) United States Patent
Roitman et al.

(10) Patent No.: US 11,281,677 B2
(45) Date of Patent: Mar. 22, 2022

(54) UTILIZING PSEUDO-RELEVANCE FEEDBACK IN FUSION-BASED RETRIEVAL

(71) Applicant: International Business Machines Corporation, Armonk, NY (US)

(72) Inventors: Haggai Roitman, Yokneam Illit (IL); Shai Erera, Gilon (IL); Bar Weiner, Ashqelon (IL)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 16/234,115

(22) Filed: Dec. 27, 2018

(65) Prior Publication Data

US 2020/0210437 A1     Jul. 2, 2020

(51) Int. Cl.
*G06F 16/00* (2019.01)
*G06F 16/2457* (2019.01)
*G06F 16/93* (2019.01)

(52) U.S. Cl.
CPC ........ *G06F 16/24578* (2019.01); *G06F 16/93* (2019.01)

(58) Field of Classification Search
CPC ............................ G06F 16/24578; G06F 16/93
USPC .................................................. 707/705–780
See application file for complete search history.

(56) References Cited

U.S. PATENT DOCUMENTS 8,538,896 B2   9/2013 Mensink et al.
10,521,469 B2 * 12/2019 Qiu ..................... G06F 16/9024

| 2010/0082615 | A1* | 4/2010 | Clinchant | G06F 16/58 707/728 |
| 2010/0198823 | A1* | 8/2010 | Tsoukalas | G06F 16/35 707/736 |
| 2010/0205172 | A1* | 8/2010 | Luk | G06F 16/24578 707/715 |
| 2012/0054130 | A1* | 3/2012 | Mensink | G06K 9/6263 706/12 |

(Continued)

OTHER PUBLICATIONS

Oren Kurland et al., Fusion in Information Retrieval, Proceedings of the 41st International ACM SIGIR Conference on Research & Development in Information Retrieval (SIGIR 2018), Jun. 2018, p. 1383-1386, https://dl.acm.org/citation.cfm?id=3210186.

(Continued)

*Primary Examiner* — Michelle N Owyang
(74) *Attorney, Agent, or Firm* — Daniel Morris; Otterstedt, Wallace & Kammer, LLP (57) ABSTRACT

An exemplary method includes: determining a pool of documents, wherein each document is within at least one of a plurality of lists, each of the lists results from executing a query on a corpus, and the corpus comprises at least the pool of documents; determining a first ranking of documents within the pool of documents based at least in part on first scores computed for respective documents within the pool; estimating relevance to the specified query at least of respective documents within the first ranking, wherein the relevance is estimated without user feedback regarding the relevance; and determining a second ranking of documents within the pool based at least in part on second scores computed at least for respective documents within the first ranking, wherein the second score for a given document is computed based at least in part on the estimated relevance of at least the given document.

17 Claims, 7 Drawing Sheets

(56) References Cited

U.S. PATENT DOCUMENTS

| | | | |
|---|---|---|---|
| 2015/0310005 A1* | 10/2015 | Ryger | G06F 16/24578 707/706 |
| 2017/0075893 A1* | 3/2017 | Hummel | G06F 16/24578 |
| 2017/0220945 A1 | 8/2017 | Barger et al. | |
| 2018/0157664 A1* | 6/2018 | Howell | G06N 20/10 |

OTHER PUBLICATIONS

Javier Parapar et al., Score Distributions for Pseudo Relevance Feedback, Information Sciences, v. 273, Jul. 2014, p. 171-181, https://www.sciencedirect.com/science/article/pii/S0020025514003181.

Haggai Roitman, Utilizing Pseudo-Relevance Feedback in Fusion-based Retrieval, Proceedings of the 2018 ACM SIGIR International Conference on Theory of Information Retrieval (ICTIR '18), Sep. 2018, p. 869-872, https://dl.acm.org/citation.cfm?id=3080665.

Haggai Roitman, An Enhanced Approach to Query Performance Prediction Using Reference Lists, Proceedings of the 40th International ACM SIGIR Conference on Research and Development in Information Retrieval (SIGIR '17), Aug. 2017, p. 203-206, https://dl.acm.org/citation.cfm?id=3234969.

Yael Anava et al., A probabilistic fusion framework, Proceedings of the 25th ACM International on Conference on Information and Knowledge Management (CIKM '16), Oct. 2016, p. 1463-1472, https://dl.acm.org/citation.cfm?id=2983739.

David Carmel et al.. Query performance prediction for IR, Proceedings of the 35th international ACM SIGIR conference on Research and development in information retrieval (SIGIR '12), Aug. 2012, p. 1196-1197, https://dl.acm.org/citation.cfm?id=2348540.

Gordon V. Cormack et al., Reciprocal rank fusion outperforms condorcet and individual rank learning methods, Proceedings of the 32nd international ACM SIGIR conference on Research and development in information retrieval (SIGIR '09), Jul. 2009, p. 758-759, https://dl.acm.org/citation.cfm?id=1572114.

Victor Lavrenko et al., Relevance based language models, Proceedings of the 24th annual international ACM SIGIR conference on Research and development in information retrieval (SIGIR '01), Sep. 2001, p. 120-127, https://dl.acm.org/citation.cfm?id=383972.

Ella Rabinovich et al., Utilizing relevance feedback in fusion-based retrieval, Proceedings of the 37th international ACM SIGIR conference on Research & development in information retrieval (SIGIR '14), Jul. 2014, p. 313-322, https://dl.acm.org/citation.cfm?id=2609573.

Anna Shtok et al., Query performance prediction using reference lists, ACM Transactions on Information Systems (TOIS), v. 34, n. 4, Sep. 2016, p. 19:1-19:34, https://dl.acm.org/citation.cfm?id=2926790.

Natali Soskin et al., Navigating in the dark: Modeling uncertainty in ad hoc retrieval using multiple relevance models, Proceedings of the 2nd International Conference on Theory of Information Retrieval: Advances in Information Retrieval Theory (ICTIR '09), Lecture Notes in Computer Science (LNCS) 5766, Sep. 2009, p. 79-91, https://link.springer.com/chapter/10.1007/978-3-642-04417-5_8.

Shengli Wu, Data Fusion in Information Retrieval, 2012, https://link.springer.com/book/10.1007/978-3-642-28866-1.

H.P. Young. An Axiomatization of Borda's Rule. Journal of Economic Theory, v. 9, n. 1, Sep. 1974, p. 43-52, https://www.sciencedirect.com/science/article/pii/0022053174900738.

Chengxiang Zhai et al., Model-based feedback in the language modeling approach to information retrieval, Proceedings of the tenth international conference on Information and knowledge management (CIKM '01), Oct. 2001, p. 403-410, https://dl.acm.org/citation.cfm?id=502654.

Chengxiang Zhai et al., A study of smoothing methods for language models applied to ad hoc information retrieval, Proceedings of the 24th annual international ACM SIGIR conference on Research and development in information retrieval (SIGIR '01), Sep. 2001, p. 334-342, https://dl.acm.org/citation.cfm?id=384019.

Yun Zhou et al., Query performance prediction in web search environments, Proceedings of the 30th annual International ACM SIGIR conference on Research and development in information retrieval (SIGIR '07), Jul. 2007, p. 543-550, https://dl.acm.org/citation.cfm?id=1277835.

Liron Zighelnic et al., Query-drift prevention for robust query expansion, Proceedings of the 31st annual international ACM SIGIR conference on Research and development in information retrieval (SIGIR '08), p. 825-826, https://dl.acm.org/citation.cfm?id=1390524.

Ellen M. Voorhees, TREC: Continuing information retrieval's tradition of experimentation, Communications of the ACM, v. 50, n. 11, Nov. 2007, p. 51-54, https://cacm.acm.org/magazines/2007/11/5520-trec.

* cited by examiner

UTILIZING PSEUDO-RELEVANCE FEEDBACK IN FUSION-BASED RETRIEVAL

STATEMENT REGARDING PRIOR DISCLOSURES BY AN INVENTOR

Haggai Roitman, "Utilizing Pseudo-Relevance Feedback in Fusion-based Retrieval," Proceedings of the 2018 ACM SIGIR International Conference on Theory of Information Retrieval (ICTIR '18), September 2018, p. 869-872, the disclosure of which is incorporated by reference herein, is submitted herewith and cited in an accompanying Information Disclosure Statement (IDS). The author of this paper is named as an inventor in the present application, and this paper was not published or otherwise made available to the public more than one year before the filing of the present application.

BACKGROUND

The present invention relates to the electrical, electronic and computer arts, and, more particularly, to improvements in processing data queries.

In fusion-based retrieval, several (base) ranked lists, each one retrieved from the same corpus by a different retrieval method, are combined together into a single aggregated ("fused") list. In other words, a given query may be evaluated (over a given corpus) by several different retrieval methods. A fusion method then combines the various retrieved (ranked) lists into a single fused-list, which is returned as the final retrieval's outcome. More formally, q denotes a query and C denotes a corpus of documents. In fusion-based retrieval, query q is being evaluated over corpus C using several different retrieval methods. Examples of these retrieval methods may include, for example, term frequency-inverse document frequency (TF-IDF), Okapi BM25, divergence-from-randomness (DFR), and language-model-based methods.

$\mathcal{L} = \{L_1, L_2, \ldots, L_m\}$ denotes a set of a set of m (>1) ranked lists, where each ranked list $L_i$ ($\in \mathcal{L}$) contains the top-k documents d ($\in$C) with the highest retrieval scores $S_i(d|q)$ according to the i-th retrieval method (i$\in$\{1, 2 ..., m\}). $\mathcal{D}_\mathcal{L} \triangleq \cup_{i=1}^{m} L_i$ denotes the pool of documents available for fusion (e.g., all documents within $\mathcal{L}$). A fusion method f takes $\mathcal{L}$ as input an returns an aggregated (top-k) ranked list, hereinafter termed the fused-list and denoted $L_f$. $S_f(d|q)$ denotes the aggregated (fused) score of document d$\in \mathcal{D}_\mathcal{L}$.

Figure 1:
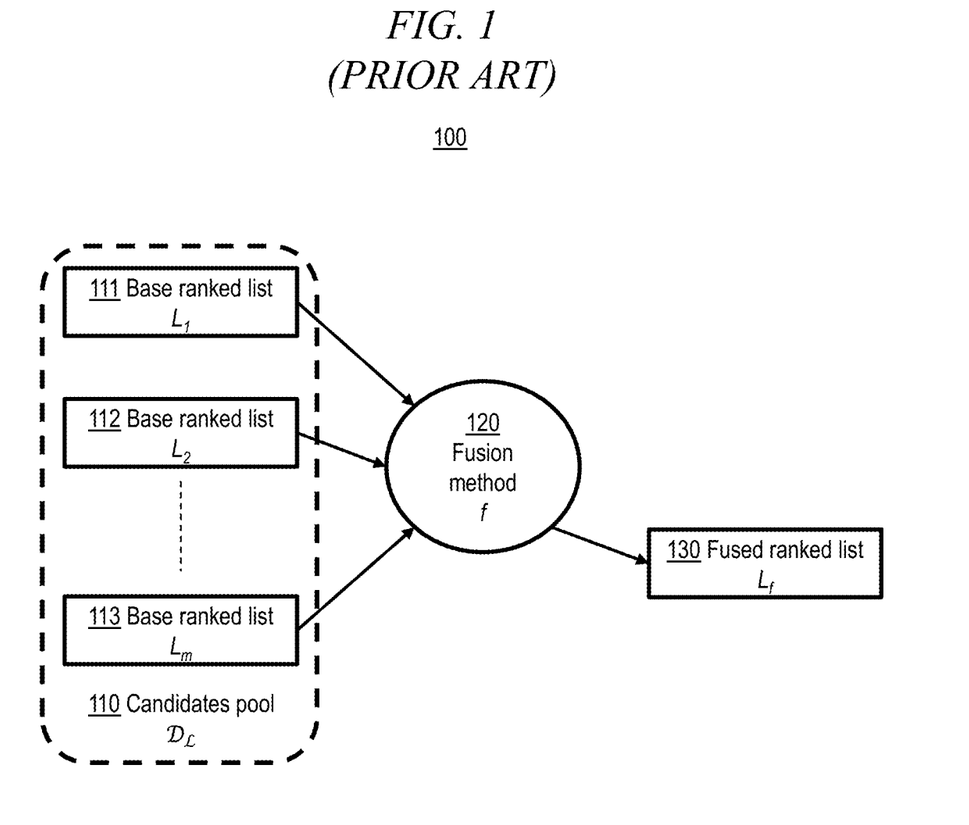
FIG. 1 shows an exemplary fusion-based retrieval process.

FIG. 1 conceptually illustrates fusion-based retrieval 100. A query q is evaluated over a corpus C using m different retrieval methods, resulting in a pool of documents $\mathcal{D}_\mathcal{L}$ comprising a set $\mathcal{L}$ 110 of m ranked lists, where each ranked list $L_i$ (i$\in$\{1, 2 ..., m\}) 111, 112, 113 containing the top-k documents d ($\in$C) with the highest retrieval scores $S_i(d|q)$ according to the i-th retrieval method. A fusion method f 120 takes the lists 111, 112, 113 within $\mathcal{D}_\mathcal{L}$ 110 as input and returns an aggregated (top-k) ranked list, hereinafter termed the fused-list and denoted $L_f$ 130.

As described in Rabinovich et al., "Utilizing relevance feedback in fusion-based retrieval," Proceedings of the 37th international ACM SIGIR conference on Research & development in information retrieval (SIGIR '14), July 2014, p. 313-322 (hereinafter "Rabinovich"), the entire disclosure of which is incorporated by reference herein for all purposes, utilizing positive (true) relevance feedback was demonstrated to significantly improve retrieval quality in fusion-based retrieval. For example, Rabinovich's PoolRank approach involves re-ranking the pool of documents d$\in \mathcal{D}_\mathcal{L}$ using relevance feedback associated with documents in the fused-list $L_f$.

However, Rabinovich's PoolRank requires that a user explicitly specify at least one example of a true relevant document for a given fused list: a true relevance model is then induced and used to rank the whole pool of candidate documents. As described in Rabinovich at 314: "we assume that a user scans the list she is presented with, $L_{fuse}$ in our case, top down until she encounters r documents that are relevant to the information need she expressed using the query q. We use $R_q^{[r]}(L_{fuse})$ (henceforth $R_q$) to denote the set of these relevant documents .... The method then produces a query model, $\mathcal{M}_{q;R_q}$, that can be used to rank documents; the score assigned to document d is S(d; $\mathcal{M}_{q;R_q}$)."

Figure 2:
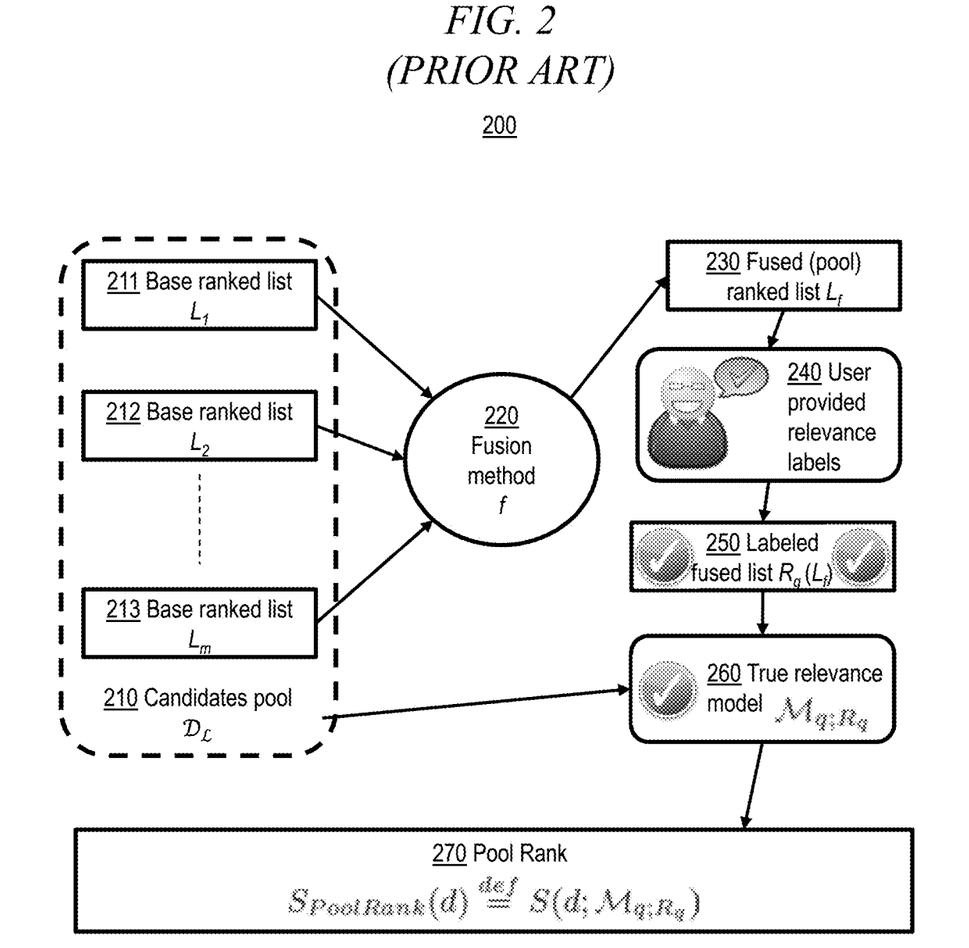
FIG. 2 shows an exemplary fusion-based retrieval process using true relevance feedback.

FIG. 2 conceptually illustrates Rabinovich's PoolRank 200. In a manner similar to that discussed above with reference to FIG. 1, a query q is evaluated over a corpus C using m different retrieval methods, resulting in a pool of documents $\mathcal{D}_\mathcal{L}$ comprising a set $\mathcal{L}$ 210 of m ranked lists, where each ranked list $L_i$ (i$\in$\{1, 2 ..., m\}) 211, 212, 213 contains the top-k documents d ($\in$C) with the highest retrieval scores $S_i(d|q)$ according to the i-th retrieval method. A fusion method f 220 takes the lists 211, 212, 213 within $\mathcal{D}_\mathcal{L}$ 210 as input and returns a fused-list $L_f$ 230. Step 240 requires a user to review fused-list $L_f$ 230 and provide relevance labels manually by indicating which documents within fused-list $L_f$ 230 are relevant to query q, thus producing labeled fused-list $R_q(L_f)$ 250. Step 260 uses the user-provided labels of relevant documents $R_q(L_f)$ 250 to produce a true (e.g., based on user feedback) relevance model $\mathcal{M}_{q;R_q}$ which is then used in step 270 to determine relevance scores S(d; $\mathcal{M}_{q;R_q}$) for each document within $\mathcal{D}_\mathcal{L}$ 210.

As previously noted, Rabinovich's PoolRank requires that a user explicitly specify at least one example of a true relevant document for a given fused list: a true relevance model is then induced and used to rank the whole pool of candidate documents. Yet, in many retrieval use-cases, no relevance feedback may be available, not even implicitly. Thus, there is a need for a technique which can provide improved result quality for fusion-based retrieval, in a manner similar to Rabinovich, but without requiring user-provided relevance feedback.

SUMMARY

An illustrative embodiment includes a method for use with fusion-based retrieval. The method includes determining a pool of documents, wherein each of the pool of the documents is within at least one of a plurality of lists, each of the plurality of lists results from executing a specified query on a specified corpus, and the specified corpus comprises at least the pool of documents. The method further includes determining a first ranking of documents within the pool of documents based at least in part on first scores computed for respective documents within the pool of documents. The method also includes estimating relevance to the specified query at least of respective documents within the first ranking, wherein the relevance is estimated without user feedback regarding the relevance. The method further includes determining a second ranking of documents within the pool of documents based at least in part on second scores computed at least for respective documents within the first ranking of documents, wherein the second score for a given document is computed based at least in part on the estimated relevance of at least the given document.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 is a table showing experimental results generated using an illustrative embodiment of the present invention.

DETAILED DESCRIPTION

Embodiments of the present invention provide techniques which enhances fusion-based retrieval (e.g., increased result quality) without user-provided (true) relevance feedback, which is often unavailable in real-life usage cases. An illustrative embodiment of the present invention uses (estimated) pseudo-relevance feedback automatically generated from the fused-list rather than (true) relevance feedback provided by a user. An illustrative embodiment estimates the relevance labels of retrieved documents as accurately as possible, even when no relevance feedback data is available, then uses these estimates to derive better pseudo-feedback models that can be utilized to improve fusion-based retrieval. Illustrative embodiments provide a robust document relevance labeling approach based on pseudo-relevance feedback induced from the various base (initial) ranked-lists, rather than true relevance feedback provided by a user. Experimental results show that illustrative embodiments of the present invention provide improved result quality (e.g., up to 9%) for fusion-based retrieval using pseudo-relevance feedback.

Figure 3:
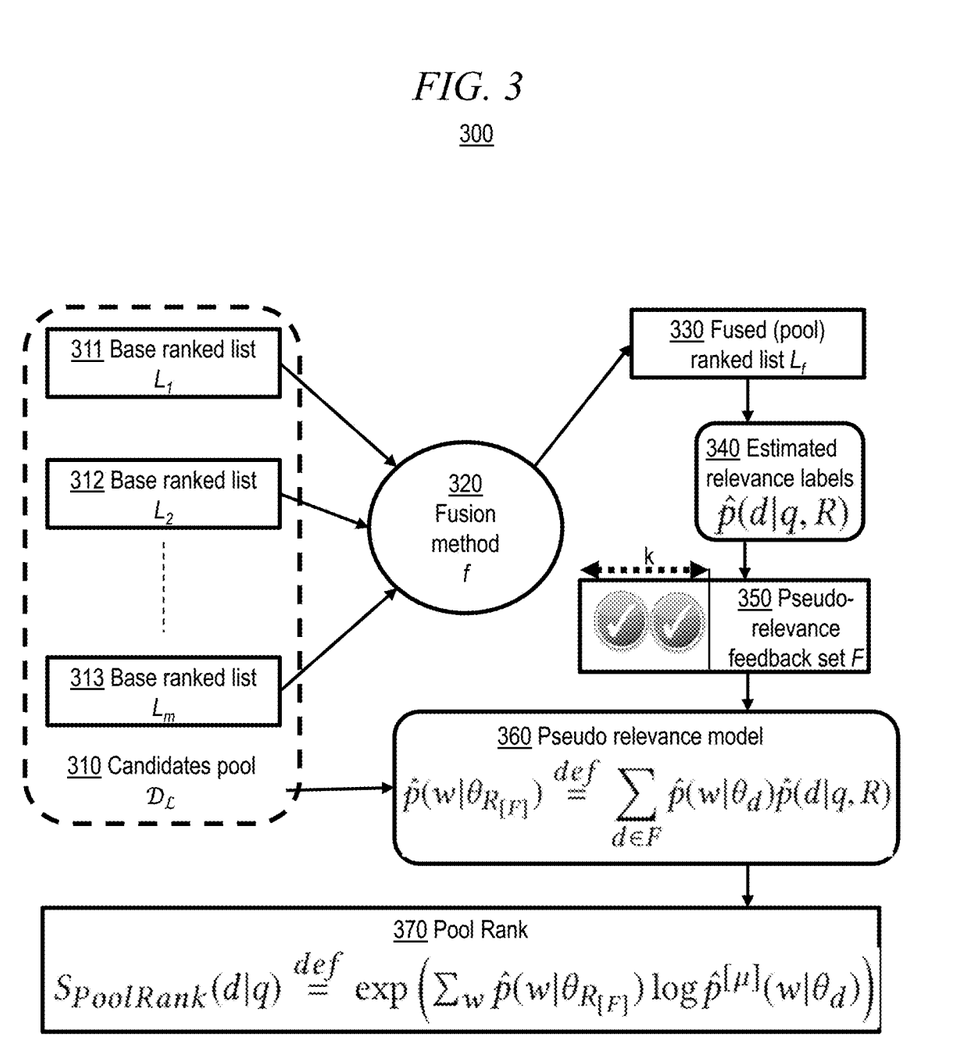
FIG. 3 shows an exemplary fusion-based retrieval process using pseudo-relevance feedback (PRF) according to an illustrative embodiment of the present invention.

FIG. 3 shows an exemplary fusion-based retrieval process 300 using pseudo-relevance feedback (PRF) according to an illustrative embodiment of the present invention. In a manner similar to that discussed above with reference to FIGS. 1 and 2, a query q is evaluated over a corpus C using m different retrieval methods, resulting in a pool of documents $\mathcal{D}_\mathcal{L}$ comprising a set $\mathcal{L}$ 310 of m ranked lists, where each ranked list $L_i$ ($i \in \{1, 2, \ldots, m\}$) 311, 312, 313 contains the top-k documents d ($\in C$) with the highest retrieval scores $S_i(d|q)$ according to the i-th retrieval method. A fusion method f 320 takes the lists 311, 312, 313 within $\mathcal{D}_\mathcal{L}$ 310 as input and returns a fused-list $L_f$ 330.

Step 340 estimates relevance labels indicating which documents within fused-list $L_f$ 330 are likely to be relevant to query q. Step 350 uses the estimated relevance labels 340 to determine a pseudo-relevance feedback set F. In contrast to $R_q$ discussed above with reference to FIG. 2, which is a set of documents within fused-list $L_f$ 330 indicated by a user as being relevant to query q (i.e., based on true relevance feedback), F is a set of documents estimated to be likely to be relevant to query q based on pseudo-relevance feedback (i.e., based on an estimate of the true relevance feedback). For example, an illustrative embodiment may assume that the top-k ranked results within the fused-list $L_f$ are relevant, such that F is assumed in step 340 to include the top-l ($l \leq k$) documents $d \in \mathcal{D}_\mathcal{L}$ with the highest fusion score $S_f(d|q)$ computed in step 320. As further discussed below, step 340 may also include calculating a relevance (label) likelihood for each document denoted as $\hat{p}(d|q, R)$ which may then be used to derive the pseudo-relevance feedback set F.

In step 360, a pseudo-relevance feedback (PRF) model $\theta_{R[F]}$ is induced from pseudo-feedback documents set F 350 estimated in step 340. An illustrative embodiment may use the RM1 relevance (language) model discussed, for example, in Victor Lavrenko et al., "Relevance based language models," Proceedings of the 24th annual international ACM SIGIR conference on Research and development in information retrieval (SIGIR '01), September 2001, p. 120-127 (hereinafter "Lavrenko"), the entire disclosure of which is incorporated by reference herein for all purposes. For a given word w (over some vocabulary), this model may be estimated from F:

$$\hat{p}(W | \theta_{R[F]}) \stackrel{def}{=} \sum_{d \in F} \hat{p}(w | \theta_d) \hat{p}(d | q, R).  \quad \text{"(hereinafter Equation 1")}$$

Formally, let c(w, x) denote the occurrence count of word w in text x, and let $|x| = \sum_{w \in x} c(w, x)$. The term $$\hat{p}(w | \theta_d) \stackrel{def}{=} \frac{c(w, d)}{|d|}$$

within Equation1 estimates the likelihood of word w given document d's (unsmoothed) language model. As discussed above with reference to step 340 within which it is computed, the term $\hat{p}(d|q, R)$ within Equation1 estimates the relevance likelihood of document $d \in F$ for query q.

Step 370 involves ranking the entire pool of candidate documents $\mathcal{D}_\mathcal{L}$ 310 based on the PRF model $\theta_{R[F]}$ induced in step 350. For example, in an illustrative embodiment, a PoolRank score of a given document $d \in \mathcal{D}_\mathcal{L}$ may be calculated according to negative cross-entropy similarity:

$$S_{PoolRank}(d|q) \stackrel{\text{def}}{=} \exp(\Sigma_w \hat{p}(w|\theta_{R[F]})) \log \hat{p}^{[\mu]}(w|\theta_d)$$

Similar to any other query-expansion approach, using $\theta_{R[F]}$ directly may incur query-drift risk as described in, e.g., Liron Zighelnic et al., "Query-drift prevention for robust query expansion," Proceedings of the 31st annual international ACM SIGIR conference on Research and development in information retrieval (SIGIR '08), p. 825-826 (hereinafter "Zighelnic"), the entire disclosure of which is incorporated by reference herein for all purposes. The query-drift risk may be reduced by multiplying the PoolRank score by the original fusion score: $S'_{PoolRank}(d|q) \stackrel{\text{def}}{=} S_{PoolRank}(d|q) \cdot S_f(d|q)$ The aforementioned approach utilizing the RM1 model as described in Lavrenko and multiplying the PoolRank score by the original fusion score has been found to result in a much more robust query-expansion as compared to an alternative approach which instead utilizes the RM3 model as described in, e.g., Natali Soskin et al., "Navigating in the dark: Modeling uncertainty in ad hoc retrieval using multiple relevance models," Proceedings of the 2nd International Conference on Theory of Information Retrieval: Advances in Information Retrieval Theory (ICTIR '09), Lecture Notes in Computer Science (LNCS) 5766, September 2009, p. 79-91 (hereinafter "Soskin"), the entire disclosure of which is incorporated by reference herein for all purposes.

Various instantiations of the relevance model in step 360 may be realized by changing the way in which the document relevance labels are estimated in step 340. PoolRank[QL] is a PoolRank variant applied with normalized query-likelihoods (QL) as document pseudo-relevance labels:

$$\hat{p}_{QL}(d|q, R) \stackrel{\text{def}}{=} \frac{p(q|d)}{\Sigma_{d' \in F} p(q|d')}$$

Here, p(q|d) denotes the query-likelihood of document d, which may be estimated as $\hat{p}(q|d) = \Pi_{w \in q} \hat{p}^{[\mu]}(w|\theta_d)^{c(w,q)}$ For a given word w and text x, $$\hat{p}^{[\mu]}(w|\theta_x) \stackrel{\text{def}}{=} \frac{c(w, x) + \mu \frac{c(w, c)}{|C|}}{|x| + \mu}$$

further denotes text x's Dirichlet smoothed language model with parameter μ. See, e.g., Chengxiang Zhai et al., "A study of smoothing methods for language models applied to ad hoc information retrieval," Proceedings of the 24th annual international ACM SIGIR conference on Research and development in information retrieval (SIGIR '01), September 2001, p. 334-342, the entire disclosure of which is incorporated by reference herein for all purposes.

PoolRank[FS] is a PoolRank variant applied with normalized fusion-scores (FS) as document pseudo-relevance labels, calculated as $$\hat{p}_{FS}(d|q, R) \stackrel{\text{def}}{=} \frac{S_f(d|q)}{\Sigma_{d' \in F} S_f(d'|q)}$$

PoolRank[FS] uses relevance labels that directly depend on the fusion score $S_f(d|q)$, which combines multiple ranker's scores. In comparison, PoolRank[QL] utilizes relevance labels that are estimated according to a single (and relatively naïve) score method, query-likelihood. Thus, PoolRank[FS] is more robust than PoolRank[QL].

As discussed above with reference to FIG. 3, base ranked lists 311, 312, 313 in $\mathcal{L}$ 310 are considered together by fusion method f 320 for obtaining the final fused-list $L_f$ 330. An illustrative embodiment of the present invention may include a labeling approach which treats these base ranked-lists as reference lists, whose own predicted quality is used for estimating the relevance of each individual document in a pool of documents from all base lists. See, e.g., Haggai Roitman, "An Enhanced Approach to Query Performance Prediction Using Reference Lists," Proceedings of the 40th International ACM SIGIR Conference on Research and Development in Information Retrieval (SIGIR '17), August 2017, p. 203-206, and Anna Shtok et al., "Query performance prediction using reference lists," ACM Transactions on Information Systems (TOIS), v. 34, n. 4, September 2016, p. 19:1-19:34, the entire disclosures of which are incorporated by reference herein for all purposes.

The predicted quality of a reference list is basically an estimate of whether that list contains any relevant information for a given query, and thus may be computed using techniques for post-retrieval query performance processing (QPP), such as the Weighted Information Gain (WIG) QPP method described by Yun Zhou et al., "Query performance prediction in web search environments," Proceedings of the 30th annual international ACM SIGIR conference on Research and development in information retrieval (SIGIR '07), July 2007, p. 543-550 (hereinafter "Zhou"), the entire disclosure of which is incorporated by reference herein for all purposes.

For a given reference list, which is assumed to be effective, the relevance of a given document (e.g., the likelihood of observing the document within that list) may be estimated according to the information gained by using it to "encode" the query-focused (relevant) part of the reference list compared to using the background (corpus) model for the same task. This estimate may be further normalized relative to the list's information diversity (e.g., the entropy of the list's centroid language model), thereby favoring lists that are more focused.

An illustrative embodiment may utilize a probabilistic fusion framework (PFF) described by, e.g., Yael Anava et al., "A probabilistic fusion framework," Proceedings of the 25th ACM International on Conference on Information and Knowledge Management (CIKM '16), October 2016, p. 1463-1472, the entire disclosures of which is incorporated by reference herein for all purposes. A relevance label likelihood $\hat{p}(d|q, R)$ for each document $d \in \mathcal{D}_\mathcal{L}$ may be estimated as follows: $\hat{p}_{PFF}(d|q, R) \stackrel{\text{def}}{=} \Sigma_{L_i \in \mathcal{L}} \hat{p}(d|L_i, R) \hat{p}(L_i|q, R)$ (hereinafter "Equation2").

The term $\hat{p}(L_i|q, R)$ within Equation2 is basically an estimate of whether list $L_i \in \mathcal{L}$ contains any relevant information (R) for query q. As previously noted, such estimate may be computed using techniques for QPP, such as the WIG QPP method described by Zhou. The term $\hat{p}(d|L_i, R)$ within Equation2 estimates the likelihood that a (presumably) relevant list $L_i \in \mathcal{L}$ will further include document d. An observation that $$\hat{p}(d | L_i, R) \propto \frac{\hat{p}(L_i, R | d)}{\hat{p}(R | L_i)}$$

can facilitate derivation of the following estimator:

$$\hat{p}(d | L_i, R) \overset{def}{=} \frac{\sum_w \hat{p}(w | \theta_{R[L_i]}) [\log \hat{p}(w | \theta_d) - \log \hat{p}(w | \theta_C)]}{-\sum_w \hat{p}(w | \theta_{L_i}) \log \hat{p}(w | \theta_{L_i})}.$$

"(hereinafter Equation 3")

The numerator of the right side in Equation3 indicates the information gain from a reference list which is focused, while the denominator of the right side in Equation3 indicates the penalty when a reference list is too general. More particularly, the estimator $\hat{p}(L_i,R|d)$ (the numerator of the right side in Equation3) is given as the information gained by generating the reference model induced from list $L_i$ (denoted $\theta_{R[L_i]}$) from document d's ($\in \mathcal{D}_\mathcal{L}$) unsmoothed language model to generating it from the background (corpus) model $\theta_C$. $\theta_{R[L_i]}$ may be estimated according to Equation1 using the normalized scores $S_i(d|q)$ as the relevance labels of the top-l documents in $L_i$. The estimator $\hat{p}(R|L_i)$ (the denominator of the right side in Equation3) may be calculated as the entropy of list $L_i$'s unsmoothed language model, which may in turn be derived as its centroid language model:

$$\hat{p}(w | \theta_{L_i}) \overset{def}{=} \frac{1}{|L_i|} \sum_{d \in L_i} \hat{p}(w | \theta_d)$$

The centroid language model may capture general topics covered by documents in the list.

Intuitively, the more a given list $L_i$ is focused towards the information need expressed in query q (i.e., there is higher relevance likelihood $\hat{P}(w|\theta_{R[L_i]})$ and lower diversity based on $L_i$'s entropy) and the more likely the document's model $\theta_d$ represents this need (compared to the background model $\theta_C$), the higher is the relevance-label likelihood of document d (with respect to query q). Using the derivation of $\hat{p}(d|L_i, R)$ in Equation3 within Equation2 may provide a more robust estimator of relevance label likelihood $\hat{p}(d|q, R)$ that better leverages the various relevance cues about a given document $d \in \mathcal{D}_\mathcal{L}$ which may be evident according to the base (reference) ranked lists $L_i \in \mathcal{L}$.

Figure 4:
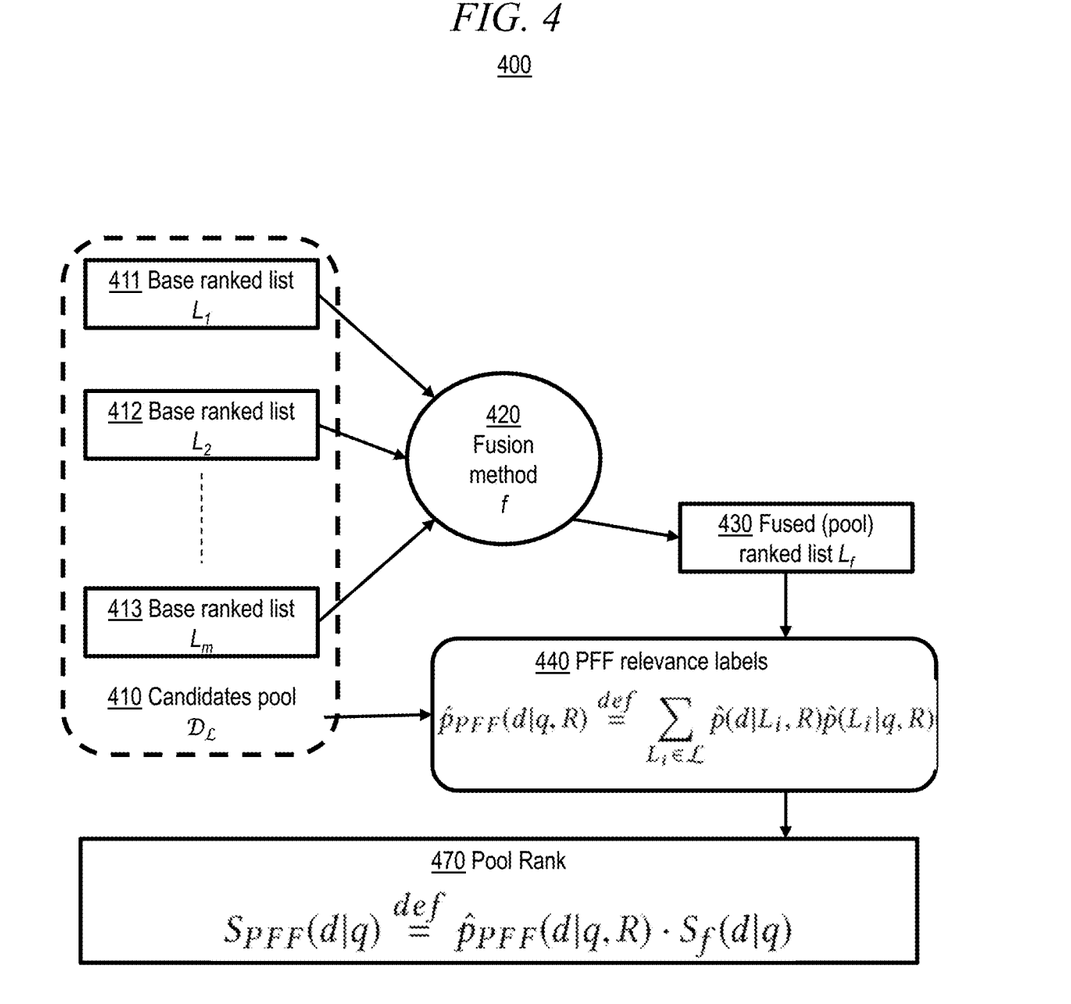
FIG. 4 shows an exemplary fusion-based retrieval process using pseudo-relevance feedback (PRF) and probabilistic fusion framework (PFF) according to an illustrative embodiment of the present invention.

FIG. 4 shows an exemplary fusion-based retrieval process PFFPoolRank 400 using pseudo-relevance feedback (PRF) and probabilistic fusion framework (PFF) according to an illustrative embodiment of the present invention. In a manner similar to that discussed above with reference to FIGS. 1-3, a query q is evaluated over a corpus C using m different retrieval methods, resulting in a pool of documents $\mathcal{D}_\mathcal{L}$ comprising a set $\mathcal{L}$ 410 of m ranked lists, where each ranked list $L_i$ ($i \in \{1, 2 \ldots, m\}$) 411, 412, 413 contains the top-k documents d ($\in C$) with the highest retrieval scores $S_i(d|q)$ according to the i-th retrieval method. A fusion method f 420 takes the lists 411, 412, 413 within $\mathcal{D}_\mathcal{L}$ 410 as input and returns a fused-list $L_f$ 430.

Figure 5:
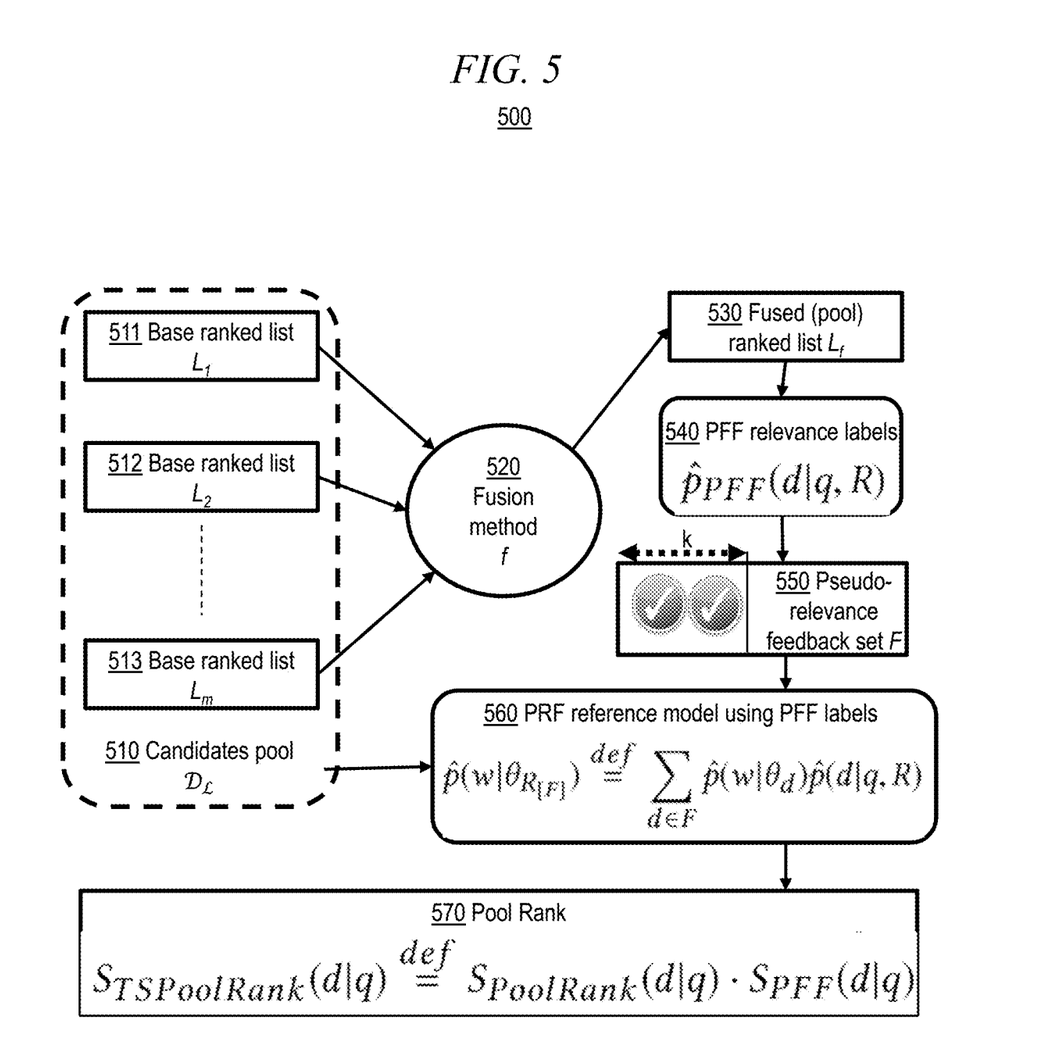
FIG. 5 shows another exemplary fusion-based retrieval process using pseudo-relevance feedback (PRF) and probabilistic fusion framework (PFF) according to an illustrative embodiment of the present invention.

Step 440 estimates PFF-based document relevance labels $\hat{p}_{PFF}(d|q, R)$ as discussed above with reference to Equation2. Step 470 uses PFF-based document relevance labels 440 to directly re-rank the documents in the pool $\mathcal{D}_\mathcal{L}$ 410. The document relevance label 440 for each document $d \in \mathcal{D}_\mathcal{L}$ can optionally be multiplied by the original fusion-score $S_f(d|q)$ to reduce query draft-risk, as discussed above with reference to Zighelnic. Thus, in step 470, each document $d \in \mathcal{D}_\mathcal{L}$ is scored (and re-ranked) according to $S_{PFF}(d|q) \overset{\Delta}{=} \hat{p}_{PFF}(d|q, R) \cdot S_f(d|q)$ FIG. 5 shows an exemplary two-stepped fusion-based retrieval process TSPoolRank 500 using pseudo-relevance feedback (PRF) and probabilistic fusion framework (PFF) according to an illustrative embodiment of the present invention. In a manner similar to that discussed above with reference to FIGS. 1-4, a query q is evaluated over a corpus C using m different retrieval methods, resulting in a pool of documents $\mathcal{D}_\mathcal{L}$ comprising a set $\mathcal{L}$ 510 of m ranked lists, where each ranked list $L_i$ ($i \in \{1, 2 \ldots, m\}$) 511, 512, 513 contains the top-k documents d ($\in C$) with the highest retrieval scores $S_i(d|q)$ according to the i-th retrieval method. A fusion method f 520 takes the lists 511, 512, 513 within $\mathcal{D}_\mathcal{L}$ 510 as input and returns a fused-list $L_f$ 530.

In a manner similar to step 440 in FIG. 4, step 540 in FIG. 5 estimates PFF-based document relevance labels as discussed above with reference to Equation2. However, step 540 in FIG. 5 also calculates $S_{PFF}(d|q)$ for each document as discussed above with reference to step 470 in FIG. 4. Step 550 then determines a pseudo-relevance feedback (PRF) set F which includes the top-l (l≤k) documents $d \in \mathcal{D}_\mathcal{L}$ with the highest score $S_{PFF}(d|q)$. Step 560 induces a pseudo-relevance feedback model $\theta_{R[F]}$ according to Equation1 as discussed above with reference to FIG. 3, but using the pseudo-relevance feedback set F (based on the score $S_{PFF}(d|q)$ in step 550) and the PFF labels estimated in step 540 according to Equation2 as discussed above with reference to FIG. 4. In step 570, each document $d \in \mathcal{D}_\mathcal{L}$ is scored (and re-ranked) according to $S_{TSPoolRank}(d|q) \overset{\Delta}{=} S_{PoolRank}(d|q) \cdot S_{PFF}(d|q)$ MultiRM is an exemplary approach which uses multiple relevance models as discussed in Soskin. MultiRM re-ranks documents $d \in \mathcal{D}_\mathcal{L}$ according to $\hat{p}(w| \theta_{R[\mathcal{L}]}) \overset{\Delta}{=} \sum_{L_i \in \mathcal{L}} \hat{p}(w|\theta_{R[L_i]})\hat{p}(L_i|q, R)$. $\hat{p}(w| \theta_{R[\mathcal{L}]})$ may then optionally be multiplied by the original fusion-score $S_f(d|q)$ to reduce query draft-risk, as discussed above with reference to Zighelnic.) In MultiRM, a (weighted) linear combination of the different relevance models $\theta_{R[L_i]}$ (1≤i≤m) is performed where the weight w of a given reference model $\theta_{R[L_i]}$ may be determined according to $\hat{p}(L_i|q, R)$, which represents a predicted quality for its associated base ranked list $L_i \in \mathcal{L}$. In other words, the term $\hat{p}(L_i|q, R)$ is an estimate of whether list $L_i \in \mathcal{L}$ contains any relevant information (R) for query q, which may be computed using techniques for post-retrieval QPP, such as WIG QPP, as discussed above.

In comparison to PoolRank[QC] and PoolRank[FS], MultiRM, like PFFPoolRank and TSPoolRank, utilizes more focused relevance cues based on pseudo-relevance models that were induced from the various based ranked lists. More particularly, MultiRM, like PFFPoolRank and TSPoolRank, combines several base relevance models with each one induced from a pseudo-relevance labels set which is based on the top retrieved documents of a given base list $L_i \in \mathcal{L}$. Unlike PFFPoolRank and TSPoolRank, MultiRM computes document relevance levels for a given base list $L_i \in \mathcal{L}$ independently of the relevance labels in the other base lists (i.e., $\mathcal{L} \setminus \{L_i\}$). PFFPoolRank and TSPoolRank actually estimate pseudo-relevance labels for all documents $d \in \mathcal{D}_\mathcal{L}$, where the label for each document depends on the relevance of all base ranked lists, thereby resulting in a more robust pseudo-relevance label estimation relative to MultiRM.

FIG. 6 is a table 600 showing experimental results generated using an illustrative embodiment of the present invention. These results compare Basic (control) fusion-based retrieval techniques that do not use any (true or pseudo) relevance feedback, e.g. discussed above with reference to FIG. 1, with various fusion-based retrieval techniques using pseudo-relevance feedback (PRF) according to embodiments of the present invention: PoolRank[QC] and PoolRank[FS] discussed above with reference to FIG. 3, MultiRM, PFFPoolRank discussed above with reference to FIG. 4, and TSPoolRank discussed above with reference to FIG. 5.

To evaluate the effectiveness of the methods, we used runs submitted to different tracks of TREC (Text REtrieval Conference) as the base ranked lists (e.g., 110, 310, 410, 510), with titles of TREC topics serving for queries, in a manner similar to that described in Rabinovich. Here, we used the ad hoc tracks of TREC3, TREC7, and TREC8; the Web tracks of TREC9 and TREC10; and the robust track of TREC12. On each track, we randomly sampled 30 subsets of 5 runs (rankers) each; each sampled run included at least 100 documents per each query.

Each subset's runs (ranked lists) were combined together using each of the fusion-based retrieval techniques (Basic, PoolRank[QC], PoolRank(FS), MultiRM, PFFPoolRank and TSPoolRank) implemented with each of four different basic fusion methods (i.e., instantiations of f 120, 320, 420, and/or 520), with each basic fusion method used to combine the same set of ranked lists (runs) in $\mathcal{L}$ and obtain a fused list $L_f$. That is to say, each of the fusion-based retrieval techniques (Basic, PoolRank[QC], PoolRank(FS), MultiRM, PFFPoolRank and TSPoolRank) was repeated for each query with each of these four basic fusion methods. Thus, each fusion method was used to score all documents $d \in \mathcal{D}_\mathcal{L}$ and to return the top-100 documents with the highest fusion score.

The first two basic fusion methods were CombSUM and CombMNZ. As a preliminary step, the document scores of each list were max-min-normalized. $\bar{S}_i(d|q)$ denotes the normalized score of document $d \in L_i$; whenever $d \notin L_i$, then $\bar{S}_i(d|q)=0$. The CombSUM score of a given document is calculated as $S_{CombSUM}(d|q, \mathcal{L}) \triangleq \Sigma_{i=1}^{m} \bar{S}_i(d|q)$. The CombMNZ score of a given document is calculated as $S_{CombMNZ}(d|q, \mathcal{L}) \triangleq NZ(d|\mathcal{L}) \cdot S_{CombSUM}(d|q, \mathcal{L})$ where $NZ(d|\mathcal{L})$ is the number of lists in $\mathcal{L}$ that contain document d.

The other two basic function methods were Borda and RRF. $rank_i(d)$ denotes the rank of document $d \in L_i$. The Borda score of a given document is defined as the number of documents not ranked higher than it in the lists; formally: $S_{Borda}(d|q, \mathcal{L}) \triangleq \Sigma_{i=1}^{m} \#\{d' \in L_i; rank_i(d') > rank_i(d)\}$. See, e.g., H. P. Young, "An Axiomatization of Borda's Rule," Journal of Economic Theory, v. 9, n. 1, September 1974, p. 43-52, the entire disclosure of which is incorporated by reference herein for all purposes. The RRF score of a given document is calculated according to its reciprocal ranks, as follows:

$$S_{RRF}(d|q, \mathcal{L}) \triangleq \Sigma_{i=1}^{m} \frac{1}{rank_i(d) + v}$$

with v=60. See, e.g., Gordon V. Cormack et al., "Reciprocal rank fusion outperforms condorcet and individual rank learning methods," Proceedings of the 32nd international ACM SIGIR conference on Research and development in information retrieval (SIGIR '09), July 2009, p. 758-759, the entire disclosure of which is incorporated by reference herein for all purposes.

For each of the PRF-based fusion techniques (PoolRank[QC], PoolRank(FS), MultiRM, PFFPoolRank and TSPoolRank), the top-20 (i.e., l=20) documents were used as the pseudo-relevance documents set F. Each induced relevance model was further clipped at a top-100 terms cutoff. The Dirichlet parameter of smoothed document models was set to p=1000. The WIG QPP described in Zhou was used for as list effectiveness estimator for realizing $\hat{p}(L_i|q, R)$ within the MultiRM, PFFPoolRank and TSPoolRank methods, with the top-5 documents of each list $L_i \in \mathcal{L}$ being used for the prediction.

As heretofore discussed, we evaluated fusion-based retrieval performance based on the top-100 documents in a given fused-list. Retrieval quality was measured (using TREC's relevance judgments) according to mean average precision at 100 (MAP@100) and precision at 10 (P@10). Each of the MAP@100 and P@10 values shown in table 600 represent an average retrieval quality obtained across the 30 samples. Bolded numbers denote the best accuracy among methods that use the same basic fusion method. Underlined numbers denote the overall best accuracy per track.

In table 600, we report statistically significant differences in quality using the two-tailed paired t-test computed at a 95% confidence level. The superscripts b, q, and f denote a statistically significant difference with Basic, PoolRank[QL], and PoolRank[FS], respectively. The subscripts i, p, and t denote a statistically significant difference with MultiRM, PFFPoolRank, and TSPoolRank, respectively.

The results in table 600 demonstrate that the ability to successfully apply pseudo-relevance feedback in fusion-based retrieval is highly dependent on the quality of the underlying pseudo-relevance labeling approach. As previously noted, PoolRank[FS] uses relevance labels that directly depend on the fusion score $S_f(d|q)$, which combines multiple ranker's scores. In comparison, PoolRank[QL] utilizes relevance labels that are estimated according to a single (and relatively naïve) score method, query-likelihood. Thus, PoolRank[FS] is more robust than PoolRank[QL]. Table 600 shows that, in the majority of cases, the retrieval quality of PoolRank[QL] was inferior to that of the control Basic, while PoolRank[FS] significantly outperformed both PoolRank[QL] and Basic. This demonstrates that, in a fusion-based retrieval setting, a better approach for determining the pseudo-relevance label of a given document is to utilize all relevance cues that are available from the (initial) base ranked-lists.

MultiRM, PFFPoolRank, and TSPoolRank generally outperformed Basic, PoolRank[QL], and PoolRank[FS]. As discussed above, relative to PoolRank[QC] and PoolRank [FS], MultiRM, like PFFPoolRank and TSPoolRank, utilizes more focused relevance lists' cues. However, PFFPoolRank provided better quality than MultiRM in the majority of cases, and most notably on the Web and robust tracks. As discussed above, unlike MultiRM, PFFPoolRank uses relevance cues which are based on all reference lists.

Using PFF-based relevance labels, in most instances, results in a significant boost in retrieval quality of 2-9%. TSPoolRank has provided the overall best retrieval quality in table 600, demonstrating that its PRF model is enhanced by using more "accurate" relevance labels. This provides empirical evidence that, using illustrative embodiments of the present invention, of the a better pseudo-relevance feedback model may be induced with a more robust pseudo-labeling estimation approach which is better tailored to fusion-based retrieval.

One or more embodiments of the invention, or elements thereof, can be implemented, at least in part, in the form of an apparatus including a memory and at least one processor that is coupled to the memory and operative to perform exemplary method steps.

Figure 7:
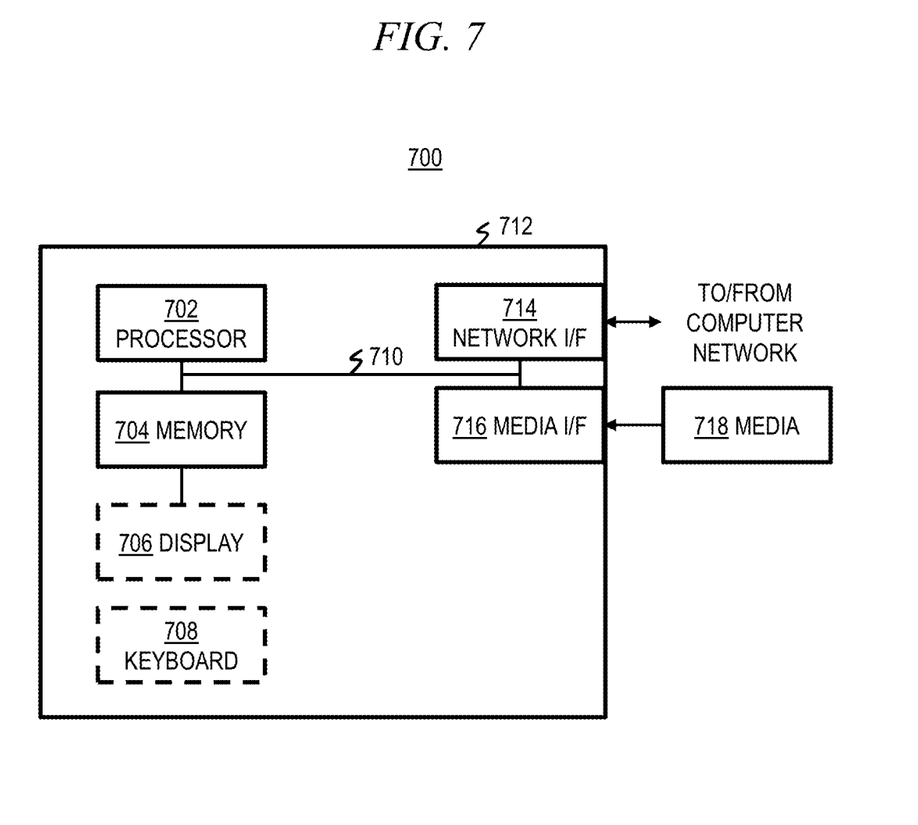
FIG. 7 shows a computer system that may be useful in implementing one or more aspects and/or elements of the invention.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for use with fusion-based retrieval, the method comprising:
   determining, by a computer, a pool of documents, wherein each of the pool of the documents is within at least one of a plurality of lists, each of the plurality of lists results from executing a specified query on a specified corpus using a specified retrieval method, and the specified corpus comprises at least the pool of documents;
   fusing, by the computer, the plurality of lists based at least in part on first scores computed for respective documents within the pool of documents to generate a fused list;
   defining a probability that a given document of the pool of documents is relevant to the specified query;
   estimating, by the computer, a respective relevance label of each document within the fused list according to relevance of each document to the specified query based on the defined probability, wherein the estimation is performed without user feedback regarding the relevance of a corresponding document;
   determining, by the computer, a pseudo-relevance feedback set without user feedback based on the estimated relevance labels that are estimated without user feedback, the pseudo-relevance feedback set comprising a set of documents from the pool of documents estimated to be likely relevant to the specified query;
   generating, by the computer, a pseudo-relevance feedback model from the pseudo-relevance feedback set that is estimated without user feedback;
   determining, by the computer, a second ranking of documents within the pool of documents based at least in part on the pseudo-relevance feedback model; and
   providing a document of the specified corpus in response to the specified query based on the second ranking of documents, via a computerized input/output interface.

2. The method of claim 1, wherein the determining a second ranking of documents further comprises computing second scores for respective documents within the pool of documents and wherein the second ranking is based on the second scores.

3. The method of claim 2, further comprising multiplying the second score by the first score to reduce query-drift risk.

4. The method of claim 1, wherein the estimating the relevance label of a given document comprises estimating whether to include the given document in the pseudo-relevance feedback (PRF) set for the specified query.

5. The method of claim 1, wherein the determining a second ranking of documents further comprises generating second scores from the estimated relevance labels without generating the pseudo-relevance feedback model.

6. The method of claim 1, wherein the first scores comprise respective fusion scores, and wherein one of the estimated relevance labels that corresponds to a given document is based at least in part on a fusion score of the given document.

7. The method of claim 1, wherein one of the estimated relevance labels comprises the probability that the given document is relevant to the query.

8. The method of claim 1, wherein the estimating the relevance label of a given document comprises:
   estimating a probability that a given list is relevant to the specified query; and
   estimating a probability that, if the given list is relevant to the specified query, the given list includes the given document;
   wherein the given list is relevant to the specified query when the given list includes at least one document which is relevant to the specified query.

9. The method of claim 8, wherein the defining the probability that the given list is relevant to the specified query comprises using post-retrieval query performance processing (QPP).

10. The method of claim 8, wherein the defining the probability that the given list is relevant to the specified query comprises using weighted information gain (WIG) post-retrieval query performance processing (QPP).

11. The method of claim 8, wherein estimating the probability that, if the given list is relevant to the specified query, the given list includes the given document comprises, for a reference model generated from the given list, estimating information gained by generating the reference model from a language model of the given document rather than generating the reference model from a background model of the specified corpus.

12. The method of claim 11, further comprising normalizing the estimated information gain relative to the entropy of a language model of the given list.

13. The method of claim 1, wherein the estimating the relevance label of a given document comprises estimating the relevance label of the given document using a probabilistic fusion framework (PFF).

14. The method of claim 1, wherein one of the estimated relevance labels is based at least in part on an estimated relevance for at least one of the plurality of lists which does not include the given document.

15. The method of claim 1, wherein one of the estimated relevance labels is based at least in part on an estimated relevance for each one of the plurality of lists.

16. An apparatus for use with fusion-based retrieval, the apparatus comprising:
   a memory; and
   at least one processor coupled to the memory, the processor being operative:
      to determine a pool of documents, wherein each of the pool of the documents is within at least one of a plurality of lists, each of the plurality of lists results from executing a specified query on a specified corpus using a specified retrieval method, and the specified corpus comprises at least the pool of documents;
      to fuse the plurality of lists based at least in part on first scores computed for respective documents within the pool of documents to generate a fused list;
      to define a probability that a given document of the pool of documents is relevant to the specified query;
      to estimate a respective relevance label of each document within the fused list according to relevance of each document to the specified query based on the defined probability, wherein the estimation is performed without user feedback regarding the relevance of a corresponding document;
      to determine a pseudo-relevance feedback set without user feedback based on the estimated relevance labels that are estimated without user feedback, the pseudo-relevance feedback set comprising a set of documents from the pool of documents estimated to be likely relevant to the specified query;
      to generate a pseudo-relevance feedback model from the pseudo-relevance feedback set that is estimated without user feedback;
      to determine a second ranking of documents within the pool of documents based at least in part on the pseudo-relevance feedback model; and
      to provide a document of the specified corpus in response to the specified query based on the second ranking of documents, via a computerized input/output interface.

17. A computer program product comprising a non-transitory machine-readable storage medium having machine-readable program code embodied therewith, said machine-readable program code comprising machine-readable program code configured:
   to determine a pool of documents, wherein each of the pool of the documents is within at least one of a plurality of lists, each of the plurality of lists results from executing a specified query on a specified corpus using a specified retrieval method, and the specified corpus comprises at least the pool of documents;
   to fuse the plurality of lists based at least in part on first scores computed for respective documents within the pool of documents to generate a fused list;
   to define a probability that a given document of the pool of documents is relevant to the specified query;
   to estimate a respective relevance label of each document within the fused list according to relevance of each document to the specified query based on the defined probability, wherein the estimation is performed without user feedback regarding the relevance of a corresponding document; and
   to determine a pseudo-relevance feedback set without user feedback based on the relevance labels that are estimated without user feedback, the pseudo-relevance feedback set comprising a set of documents from the pool of documents estimated to be likely relevant to the specified query;
   to generate a pseudo-relevance feedback model from the pseudo-relevance feedback set that is estimated without user feedback;
   to determine a second ranking of documents within the pool of documents based at least in part on the pseudo-relevance feedback model; and to provide a document of the specified corpus in response to the specified query based on the second ranking of documents, via a computerized input/output interface.

* * * * *